Nov. 3, 1959     H. W. AUSTIN ET AL     2,910,702
ENERGY ABSORPTION DEVICE
Filed Nov. 2, 1956

INVENTORS
HARRY W. AUSTIN &
ROBERT R. HORNICKEL
BY
Brown, Critchlow, Flick & Peckham
THEIR ATTORNEYS

United States Patent Office

2,910,702
Patented Nov. 3, 1959

2,910,702
ENERGY ABSORPTION DEVICE

Harry W. Austin and Robert R. Hornickel, Monroeville, Pa., assignors to Mine Safety Appliances Company, Pittsburgh, Pa., a corporation of Pennsylvania Application November 2, 1956, Serial No. 620,057

4 Claims. (Cl. 2—3)

This invention relates to devices for absorbing sudden forces imposed upon them, and more particularly to such devices used in connection with safety equipment worn by individuals.

In protective hats, safety belts and the like, it is highly desirable to have means for absorbing excessive forces that are received so that they will not be transmitted to the wearer and cause injury. A force is not absorbed unless it is consumed in doing work so that it cannot be used again for any other purpose. For example, any force that is used to permanently deform an object is dissipated and can be considered as being absorbed. Ordinary resilient or elastic shock absorbers do not actually absorb shock, but merely store it momentarily and then release it. Consequently, they are not much help in protecting a person from severe shocks or impacts.

It is among the objects of this invention to provide a device which absorbs energy, which is of extremely simple construction, and which can be used to limit movement of an object connected to it after it has absorbed excessive energy.

In accordance with this invention, a pair of generally parallel, flexible elongated elements have the ends of one tightly secured to the other element. Between those ends, one element is slack while the other element is taut. The taut element is substantially inelastic and has less tensile strength than the slack element. Consequently, when sudden excessive tension or strain is exerted on the taut element it will brake and the slack element then will be pulled taut. The force required for breaking the first element is absorbed by it. When this device is used as a crown lace in a protective hat, the slack element will limit the distance that the hat can be pushed down on the head after the originally taut element has been broken. In a safety belt line the originally slack element will support the man after the taut element has been broken by the force of his fall.

The invention is illustrated in the accompanying drawings, in which

Figure 1:
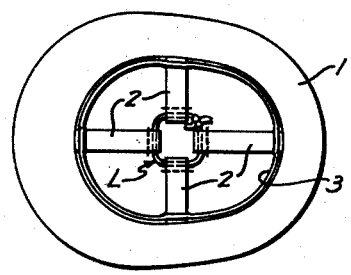
Fig. 1 is a bottom view of a protective hat containing a lining provided with our force absorption device.
Figure 2:
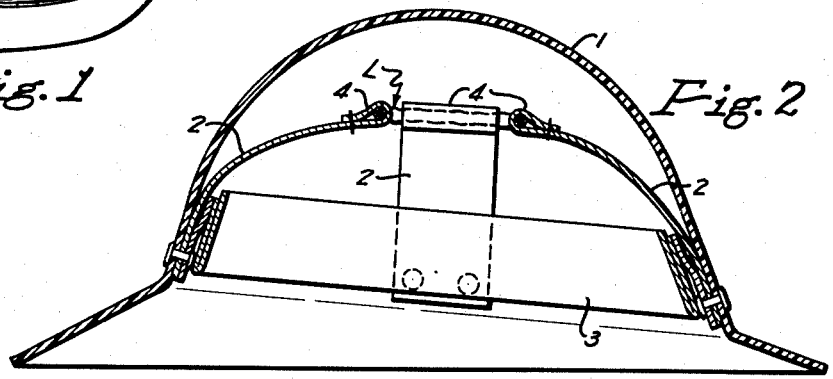
Fig. 2 is an enlarged cross section, taken through the center of Fig. 1.
Figure 3:
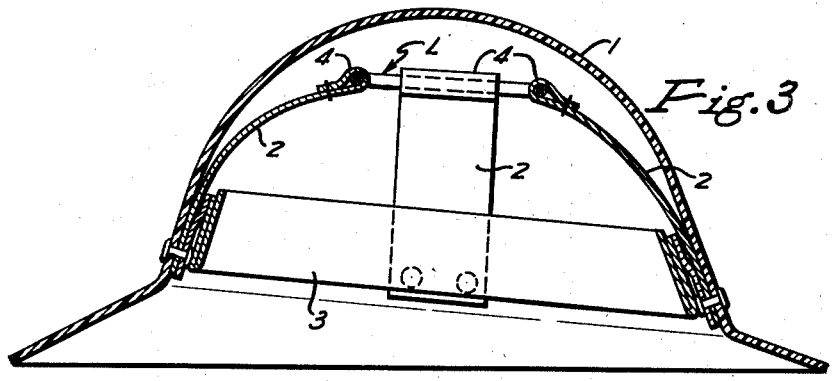
Fig. 3 is a similar sectional view showing the lining after part of the force absorption device has been broken.

Referring to Fig. 1 of the drawings, the rigid shell 1 of any conventional protective hat is formed of any suitable material and contains a lining that may be formed from conventional cradle straps 2 attached at their lower ends to a head band 3. The head band is connected in any suitable manner to the lower part of the shell. The upper ends of the cradle straps are provided with loops 4, through which a lace L is threaded. The ends of the lace are tied together in a knot. The lace not only provides means for connecting the straps, but it also allows the cradle to be adjusted for heads of different crown heights.

Figure 4:
Fig. 4 is an enlarged side view, partly broken away, of the crown lace.
Figure 5:
Fig. 5 is a similar view of the lace, showing the inner element broken and the outer one pulled taut.

It is a feature of this invention that the crown lace forms an energy absorber or shock absorber when the hat is struck by an object with a force which is more than can be safely endured by the wearer of the hat. Accordingly, the lace L is formed from two long flexible elements disposed parallel to each other. Preferably, as shown in Fig. 4, one element extends through the other. The outer one may be a braided tubular cord 6 like a tubular shoe lace, and the inner element a solid cord 7, which extends through the tubular one. The ends of one element, most suitably the outer one, are secured tightly to the inner element by any suitable means. These may be sleeves 8 compressed tightly around the adjoining ends, or simply knots in the ends of the two cords. One of the cords, preferably the inner one, is formed with less tensile strength than the other one. The weaker cord, which is inner cord 7 in Figs. 4 and 5, is a little shorter than the tubular cord between sleeves 8, so that there will be slack in the tubular cord while the inner one is taut.

Under ordinary conditions of use the crown lace performs only its normal function of adjustably connecting the upper ends of the cradle straps together. The inner cord 7 of the lace is strong enough to endure impact blows on the hat of low and intermediate intensity. However, if the force of the impact reaches high proportions so that excessive tension is exerted on the crown lace, the taut inner cord will be broken, as shown in Fig. 5. The amount of energy required to break the cord is permanently absorbed and therefore is not transmitted to the head. As soon as the inner cord is broken, the outer tubular cord 6 is pulled tight and, being considerably stronger than the broken one, keeps the cradle straps connected together so that the helmet shell will not be jammed down onto the head. The tubular element therefore takes over whatever load is left after the inner cord has been broken.

It will be seen that with this invention a true shock absorber is provided in a protective hat, without adding any new elements to the hat and without changing the appearance of the lining. The energy absorption device is simple in construction and appearance and is inexpensive to make. It can quickly and easily be replaced in case the taut element is broken by excessive tension applied to it. Even after that element is broken, however, the lace continues to perform its main function of tying the upper ends of the cradle straps together.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The combination with the cradle straps of a protective hat lining, of a force absorbing lace connecting the upper ends of said straps, the lace comprising a flexible tubular element and a flexible element extending through the tubular element, and means tightly securing the ends of the tubular element to the element inside of it, one element being slack while the other is taut, and said taut element having less tensile strength than the slack element, whereby sudden excessive strain on the lace will break the taut element and pull the slack element taut, the force required for said breaking being absorbed by the broken element.

2. The combination recited in claim 1, in which the inner element is the taut element and is substantially inelastic.

3. The combination with the cradle straps of a protective hat lining, of a force absorbing lace connecting the upper ends of said straps, the lace comprising a flexible tubular element and a flexible element extending through the tubular element, and means tightly securing the ends of the tubular element to the element inside of it, one element being elongatable a predetermined amount relative to the other, and said other element having less tensile strength than said elongatable element, whereby sudden excess strain on the lace will break the weaker element while the stronger one is elongating, the force required for said breaking being absorbed by the broken element.

4. The combination recited in claim 3, in which said weaker element is substantially inelastic.

References Cited in the file of this patent

UNITED STATES PATENTS

| | | |
|---|---|---|
| 508,429 | Lewis et al. | Nov. 14, 1893 |
| 906,557 | Peterson | Dec. 15, 1908 |
| 1,408,373 | Lustgarten | Feb. 28, 1922 |
| 1,774,710 | Surkin | Jan. 21, 1930 |
| 2,452,228 | Dawes et al. | Oct. 26, 1948 |
| 2,455,797 | Myers et al. | Dec. 7, 1948 |
| 2,581,366 | De Grazia | Jan. 8, 1952 |
| 2,758,305 | Gross | Aug. 14, 1956 |
| 2,796,609 | Fisher et al. | June 25, 1957 |

FOREIGN PATENTS

| | | |
|---|---|---|
| 556,515 | Great Britain | Oct. 7, 1943 |